United States Patent [19]

Tatemoto

[11] Patent Number: 5,081,192

[45] Date of Patent: Jan. 14, 1992

[54] NOVEL POLYMER AND ITS PREPARATION AND USE

[75] Inventor: Masayoshi Tatemoto, Takatsuki, Japan

[73] Assignee: Daikin Industries Ltd., Osaka, Japan

[21] Appl. No.: 354,287

[22] Filed: May 19, 1989

[30] Foreign Application Priority Data

May 21, 1988 [JP] Japan .................................. 63-124620

[51] Int. Cl.$^5$ ...................... C08F 259/08; C08F 30/08; C09K 3/10
[52] U.S. Cl. .................................. 525/288; 106/287.13; 106/287.27; 525/276; 526/242; 526/279
[58] Field of Search .................................. 525/276, 288

[56] References Cited

U.S. PATENT DOCUMENTS

| | | | |
|---|---|---|---|
| 3,929,850 | 12/1975 | Streck et al. | 526/143 |
| 4,020,043 | 4/1977 | Siefken | 525/276 |
| 4,191,714 | 3/1980 | Yonezawa et al. | 528/38 |
| 4,861,836 | 8/1989 | Tatemoto et al. | 525/288 |

FOREIGN PATENT DOCUMENTS 0228365 7/1987 European Pat. Off. .
1294410 4/1962 France .

*Primary Examiner*—John C. Bleutge
*Assistant Examiner*—Vasu S. Jagannathan
*Attorney, Agent, or Firm*—Birch, Stewart, Kolasch & Birch

[57] ABSTRACT

A polymer of the formula:

$$PC-[CH_2CYI-(CH_2)_n-SiR_xX_{3-x}]_m \quad (I)$$

wherein PC is a polymer chain, X is a monovalent functional group, Y is a hydrogen atom or a lower alkyl group, R is a hydrogen atom or an inactive monovalent organic group, X is an integer of 0 to 3, m is a positive integer which is not larger than the number of ends of the polymer chain PC, and n is 0, 1 or 2, having a molecular weight of $5 \times 10^2$ to $5 \times 10^6$, which is relatively stable and easily handled.

6 Claims, 10 Drawing Sheets

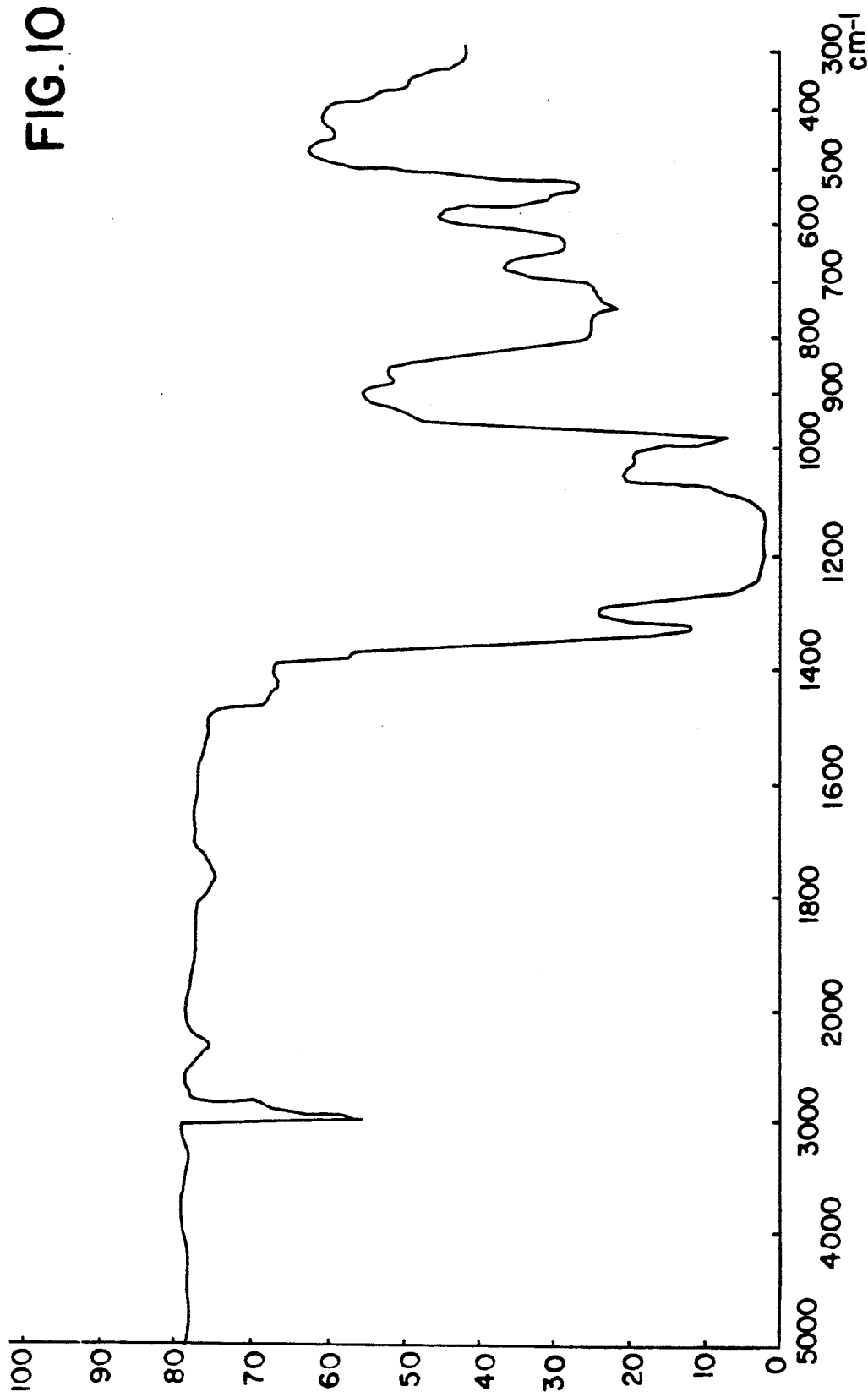

NOVEL POLYMER AND ITS PREPARATION AND USE

BACKGROUND OF THE INVENTION

1. Field of the Invention

The present invention relates to a novel polymer and its preparation and use. More particularly, the present invention relates to a novel polymer which has a terminal group containing an iodine atom and a silicon atom, its preparation and use.

1. Description of the Related Art

A polymer having, at its molecular end, a group of the formula:

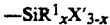

wherein $R^1$ is an aliphatic or aromatic hydrocarbon group; X' is a halogen atom, $-OR^1$, $-OCOR^1$, $-ON=Z$ or $-OC(R^1)=CR''_2$ in which Z is $=C(R^1)_2$ or $=CR'$, R' is a divalent hydrocarbon group having 3 to 6 carbon atoms and R'' is a hydrogen atom or a lower alkyl group; and x is an integer of 0 to 3 is hydrolyzed with moisture at room temperature and cured through formation of a bond of the formula:

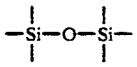

whereby the polymer is condensation polymerized or cross linked (cf. Encyclopedia of Chemical and Technology, 12, 464-569 (1970)).

Such crosslinking is applied to fluorine-containing polymers including (1) fluorosilicones,
(2) copolymers of fluoroolefins and vinylsilane and
(3) α,ω-bis(dialkylchlorosilyl)polyfluoroalkane (cf. J. Polym. Sci., Part-A, 10(3), 947-953).

The polymers in the group (2) contain the $-SiR'_x X'_{3-x}$ group which are randomly bonded to the backbone, while the polymers in the groups (1) and (3) are so-called telechelic polymers which contain said group mainly at the ends of backbone. The polymers in the group (3) are called "hybrid silicone" and attracting attention.

SUMMARY OF THE INVENTION

One object of the present invention is to provide a novel polymer which is a type of telechelic hybrid silicone, particularly a polymer having a group of the formula:

wherein X is a monovalent functional group, Y is a hydrogen atom or a lower alkyl group, R is a hydrogen atom or an inactive monovalent organic group, x is an integer of 0 to 3, and n is 0, 1 or 2 at the ends of backbone.

Another object of the present invention is to provide a process for producing such a novel telechelic hybrid silicone.

Further object of the present invention is to provide use of such a novel telechelic hybrid silicone.

Accordingly, the present invention provides a polymer of the formula:

wherein PC is a polymer chain, X is a monovalent functional group, Y is a hydrogen atom or a lower alkyl group, R is a hydrogen atom or an inactive monovalent organic group, x is an integer of 0 to 3, m is a positive integer which is not larger than the number of ends of the polymer chain PC, and n is 0, 1 or 2, having a molecular weight of $5 \times 10^2$ to $5 \times 10^6$.

BRIEF DESCRIPTION OF THE DRAWINGS

FIGS. 9 and 10 are the IR spectra of the polymers obtained in Example 7.

DETAILED DESCRIPTION OF THE INVENTION

Figure 1:
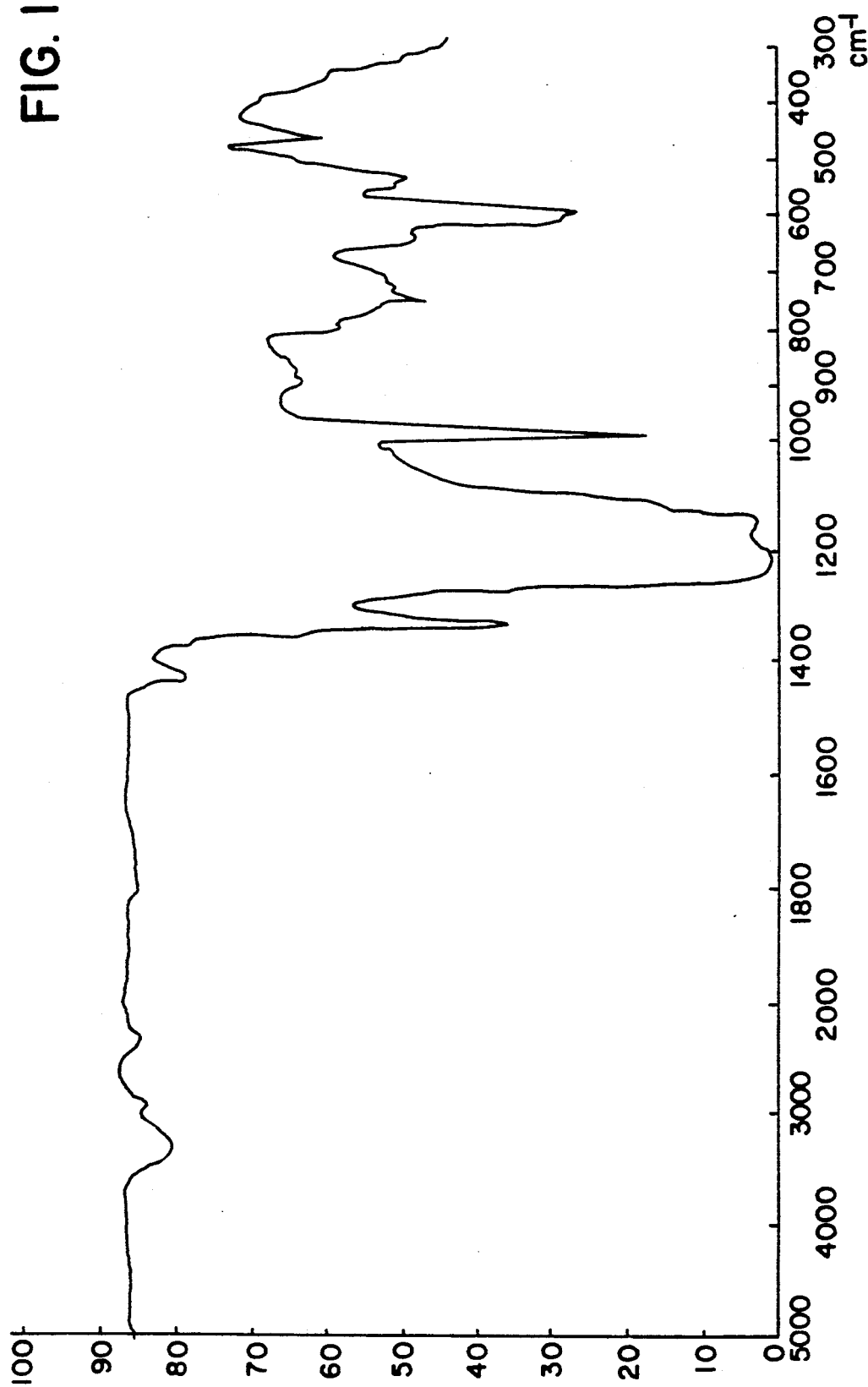
FIGS. 1 and 2 are the IR spectra of the polymers obtained in Example 1 (2) and (3)

In the polymer (I), preferred examples of the functional group X are a halogen atom (e.g. chlorine, fluorine, bromine and iodine), or a group of the formula $-OR$, $-OCOR$, $-OC=C(R)R''_2$ or $-ON=Z$ wherein Z is $=C(R)_2$ or $=CR'$ in which R' is a divalent aliphatic hydrocarbon group having 3 to 6 carbon atoms, R'' is a hydrogen atom or a lower alkyl group, and R is the same as defined above. As the group R, aliphatic hydrocarbon groups having 1 to 4 carbon atoms or aromatic hydrocarbon groups having 6 to 8 carbon atoms are preferred. Specific examples of the aliphatic or aromatic hydrocarbon groups are methyl, ethyl, propyl, n-butyl, phenyl, p-tolyl, etc.

The "lower" alkyl group is intended to define an alkyl group having 1 to 4 carbon atoms.

In general, the fluoropolymers have not only good heat resistance and chemical resistance but also peculiar functions such as water- and oil-repellency and a low refractive index. Among the polymers of the present invention, the flourine-containing polymers not only have such general characteristics of the fluoropolymers but also provide novel reactive polymers which have good cross-linkability and improved mechanical properties due to the synergistic effect of the iodine atom and the silicon atom in the above end groups. Needless to say, other polymers of the present invention are also novel reactive polymers having the same cross-linkability and improved mechanical properties as the fluorine-containing polymers.

Although it is known to provide the reactive polymer through the introduction of the silicon-containing group at the molecular end of the polymer, according to the present invention, the reactivity of the polymer is improved by the function of the iodine atoms present in the end group. In addition, since the polymer of the present invention is cross linked at two different cross linking sites, namely the silicon-containing groups and the iodine atoms, brittleness of the polymer which is not satisfactorily overcome by the conventional hybrid silicone can be overcome by the polymer of the present invention, when it is cross-linked optionally in the presence of a cross linking agent such as triallyisocyanurate.

The reactive polymer of the present invention can be prepared by addition reaction of a polymer of the formula:

$$PC-(I)_m \quad (II)$$

wherein PC and m are the same as defined above with a silicon-containing unsaturated compound of the formula:

$$CH_2=CY-(CH_2)_n-SiR_xX_{3-x} \quad (III)$$

wherein R, X, Y, n and x are the same as defined above. Specific examples of the silicon-containing unsaturated compound (III) are $CH_2=CHSiCl_3$, $CH_2=CHSiHCl_2$, $CH_2=CHCH_2-SiCl_3$, $CH_2=CHSi(OC_2H_5)_3$, $CH_2=C(CH_3)SiCl_3$ and the like.

The addition reaction can be radically performed by utilizing the radical chain transfer reactivity of the terminal iodine atom(s) of the polymer (II), and the highly pure product can be obtained in a high yield.

The addition reaction can be carried out at a temperature of $-20°$ C. to $+150°$ C. under autogenous pressure or in an atmosphere of an inert gas such as nitrogen. As a reaction initiator, radical generating compounds such as fluorine-containing diacylperoxide, diisopropyl peroxydicarbonate (IPP), azobisisobutyronitrile (AIBN) and di-tert.-butylperoxide (DTBP) as well as light can be used.

The silicon-containing compound (III) is preferably used at least in an equivalent amount to the iodine contained in the terminally iodinated polymer (II), although the silicon-containing compound (III) may be used in a smaller amount.

In the present invention, not only fluorine-containing polymers but also hydrocarbon polymers can be used as the terminally iodinated polymer (II). Examples of the hydrocarbon polymer are ethylene-propylene copolymers, polybutadiene, polyvinyl chloride, polystyrene, polyacrylate and polymethacrylate, both end of which polymer molecule are blocked with iodine atoms. In addition, any polymer having terminal iodine atoms to which the unsaturated compound (III) can be added may be advantageously used in the present invention.

Preferred examples of the fluoropolymer chain are homopolymers or copolymers comprising at least one of ethylenically unsaturated fluorinated compounds such as $C_2F_4$, $C_2F_3Cl$, $C_3F_6$, $CF_2=CFOR_f$ wherein $R_f$ is a perfluoroalkyl group having 1 to 16 carbon atoms, ω-hydroperfluoroalkyl group having 1 to 16 carbon atoms or a fluoroalkoxy group of the formula:

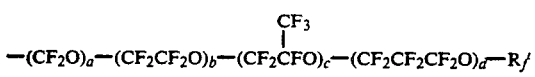

$$-(CF_2O)_a-(CF_2CF_2O)_b-(CF_2CFO)_c-(CF_2CF_2CF_2O)_d-R_f'$$
with $CF_3$ branch on the third unit in which a, b, c and d are each an integer of 0 to 20 provided that the sum of a, b, c and d is not larger than 200 and $R_f'$ is a fluoroalkyl group having 1 to 3 carbon atoms, $C_2F_2H_2$ and $C_2F_3H$; and copolymers of such ethylenically unsaturated fluorinated compounds with ethylenically unsaturated hydrocarbons such as $C_2H_4$ and $C_3H_6$.

Although the molecular weight of such a polymer is selected from a wide range, it is preferred to use a low molecular weight polymer in view of its processability as the reactive polymer. Preferably, the polymer has a number average molecular weight of about 500 to 50,000. Insofar as the polymer is soluble in a solvent, it may have a larger molecular weight, for example, up to 5,000,000. In case of the large molecular weight polymer, the reaction to prepare the polymer having the $SiR_xX_{3-x}$ group is carried out at a polymer concentration at which no problem is caused by excessive viscosity of the reaction system. During processing or application of the produced polymer, the viscosity can be controlled through the adjustment of the concentration of the solution and/or temperatures for processing or application. If desired, the reaction in the present invention and the processing or application of the polymer of the present invention can be facilitated by the use of a non-aqueous emulsion.

The molecular structure or the synthetic method of the reactive polymer of the present invention depend on the type of iodinated polymer to be used as the starting material.

The molecular structure of the iodinated polymer is disclosed in, for example, Japanese Patent Kokai Publication No. 125491/1978 and Japanese Patent Publication Nos. 4728/1983 and 57324/1986.

The basic reaction in the present invention is as follows:

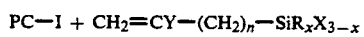
$$PC-I + CH_2=CY-(CH_2)_n-SiR_xX_{3-x}$$
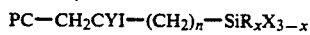
$$PC-CH_2CYI-(CH_2)_n-SiR_xX_{3-x}$$

In some cases, the bonded iodine atom is not necessary and may be removed.

When X is a halogen atom, the iodine atom can be removed by treating the iodinated polymer with an alcohol and an element in the II or III group of the Periodic Table, preferably zinc. By this reaction, the iodine atom is replaced with a hydrogen atom, and X may be changed to an alkoxy group. This deiodination reaction is represented by following reaction formula:

$$PC-CH_2CYI-(CH_2)_n-SiR_xX_{3-x}$$
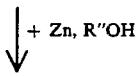
$$+ Zn, R''OH$$
$$PC-CH_2CHY-(CH_2)_n-SiR_x(OR'')_{3-x}$$

Also, the removal of the iodine atom can be carried out stepwise. In such case, the reaction can be represented by the following reaction formulae:

$$PC-CH_2CYI-(CH_2)_n-SiR_xX_{3-x}$$
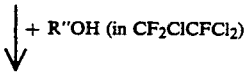
$$+ R''OH \text{ (in } CF_2ClCFCl_2\text{)}$$
$$PC-CH_2CYI-(CH_2)_n-SiR_x(OR'')_{3-x}$$
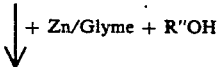
$$+ Zn/Glyme + R''OH$$
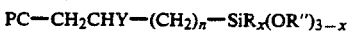
$$PC-CH_2CHY-(CH_2)_n-SiR_x(OR'')_{3-x}$$

or

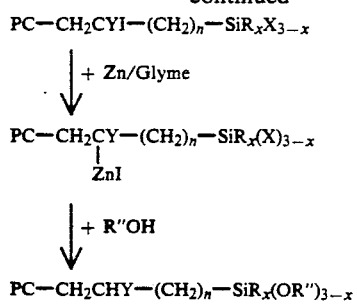

-continued $$PC-CH_2CYI-(CH_2)_n-SiR_xX_{3-x}$$

$$\downarrow + Zn/Glyme$$

$$PC-CH_2CY-(CH_2)_n-SiR_x(X)_{3-x}$$
$$\phantom{PC-CH_2C}|$$
$$\phantom{PC-CH_2C}ZnI$$

$$\downarrow + R''OH$$

$$PC-CH_2CHY-(CH_2)_n-SiR_x(OR'')_{3-x}$$

In the above deiodination reaction, zinc is used in an equivalent amount or more to the iodine atom, and the alcohol is used in an equivalent amount or more to the halogen atom when X in the $SiR_xX_{3-x}$ group is the halogen atom. Examples of the alcohol are monohydric lower alcohols such as methanol, ethanol, n-propanol, isopropanol, n-butanol, etc.

The reaction temperature is usually from $-20°$ C. to $+100°$ C., preferably $+10°$ C. to $+40°$ C.

The polymer of the present invention has following advantages:

1. The molecular weight is easily controlled.
2. The polymer chain may comprise a block polymer chain.
3. The polymer has a narrow molecular weight distribution, and comparatively low solution and melt viscosities relative to the molecular weight, so that it is easily handled.
4. Only a few techniques are suitable for bonding the silicon-containing reactive group to the telechelic polymer through a bond other than by bonding through the easily hydrolyzable bonds such as the ester or amide bond. Even if such technique is available, the polymer yield is not satisfactory, particularly when the silicon-containing reactive group is to be bonded to the end of fluoropolymer chain. Hitherto, no telechelic fluoropolymer having the silicon-containing reactive group with practically satisfactory properties has been prepared. However, since the terminal iodine atoms of the iodinated polymer $PC-(I)_m$ used according to the present invention has high radical reactivity, the polymer easily undergoes the addition reaction with the unsaturated compound (III). Thereby, it is possible to produce, in a high yield, the polymer having the telechelic silicon-containing reactive group which is bonded through only the stable carbon-carbon and carbon-silicon bonds but not through the easily hydrolyzable ester or amide bond.
5. Since the impurities can be removed from a low molecular weight compound by a simple method such as distillation, any desired compound may be produced if the high yield is not sought. In case of the polymer such as $PC-(I)_m$, the impurity cannot be practically removed unless the yield is high. Then, by conventional methods, it is almost impossible to produce a highly reactive telechelic polymer having the silicon-containing reactive group. Since the polymer $PC-(I)_m$ contains the iodine atom(s), it can provide such highly reactive telechelic polymer in a high yield and purity without purification.
6. Since the beforehand produced $PC-(I)_m$ is used as the starting material, polymers having various polymer chains PC which have not been produced by the conventional methods can be produced with changing their composition freely. Thereby, the kind of the polymer chain can be selected from a wide range.

The polymer of the present invention can be stored for a long period without any deterioration when kept in a dry state. Once it is exposed to the air, it forms a siloxane bond through dehydration condensation of a silanol which is formed by hydrolysis of the $SiR_xX_{3-x}$, whereby the molecular weight increases and further three dimensional cross linkings are formed to proceed with the curing of the polymer.

In the uncross-linked state, the polymer of the present invention is generally flowable at room temperature and easily molded in a mold or coated on a substrate. When the polymer has the large molecular weight and is not flowable, it is dissolved in a suitable solvent or dispersed in a solvent in which the polymer is insoluble to form an organosol or emulsion. When the polymer of the invention is used as a coating by utilizing the property of the silicon-addition, the polymer of the present invention has improved affinity with inorganic materials such as $SiO_2$ and it can be well blended with such the inorganic materials in the coating.

The above properties of the polymer of the present invention make it possible for the polymer to use as a sealant, a sealing compound, a coating, a coupling agent and a finishing agent. When the polymer is the fluoropolymer, it has excellent performances due to thermal and chemical stability of the fluoropolymer chain and the siloxane bonds.

When the polymer is used as a finishing agent, it is useful to form a low-energy surface, so that it can impart water- and oil-repellency to the substrate surface or a release property to a mold for molding plastics.

When the polymer of the present invention comprises the fluoropolymer chain, it has less humidity resistance and good electrical properties such as a small dielectric constant and insulation properties, and therefore it is useful as a coating or sealing agent for electric parts or semiconductor devices.

A curing composition comprising the polymer of the present invention may contain fine power fillers (e.g. silica, alumina, titanium oxide, carbon, cement, etc.); alkoxides of titanium, aluminum and silicon; and fine powder of fluororesins (e.g. low molecular weight polytetrafluoroethylene, tetrafluoroethylene/hexafluoropropylene copolymer, etc.) as hardness modifiers or extenders. In addition, a conventional cross linking agent can be added to the curing composition.

PREFERRED EMBODIMENTS OF THE INVENTION

The present invention will be illustrated by following Examples.

EXAMPLE 1

(1) In an autoclave having an internal volume of 500 ml, 1,4-diiodoperfluorobutane (49 g) and diisopropyl peroxydicarbonate (hereinafter referred to as "IPP") (1 g) were charged. After thoroughly purging the interior atmosphere with nitrogen, perfluoro(propyl vinyl ether) (300 g) was injected, and then tetrafluoroethylene (hereinafter referred to as "TFE") was injected to 8 kg/cm²G at 45° C. while stirring. Immediately, the internal pressure dropped because of the start of polymerization, and the reaction was continued with injecting TFE to keep the pressure constant at 8 kg/cm²G. After 2 hours from the start of polymerization, the temperature was raised to 50° C. After 11 from the start of polymerization, the temperature was lowered and the pressure was released. Then, the liquid product was recovered, and the volatiles were removed from the product with a rotary evaporator under reduced pressure to obtain a viscous liquid polymer (233 g).

$^{19}$F-NMR analysis of the polymer revealed that the polymer contained 34% by mole of perfluorovinyl ether and 2% of iodine. GPC analysis using trichlorotrifluoroethane as the solvent revealed that the polymer had the number average molecular weight (Mn) of 2,100, the weight average molecular weight (Mw) of 2,900 and Mw/Mn of 1.38.

(2) The liquid polymer obtained in the step (1) (45 g) was dissolved in $Cl(CF_2CFCl)_2Cl$ (100 g) and charged in a three-necked 300 ml flask together with vinyltrichlorosilane (22 g) and di-tert.-butylperoxide (hereinafter referred to as "DTBP") (0.4 g). Then, the mixture was stirred in a nitrogen atmosphere at a temperature of 110 to 120° C. for 6 hours. The product was treated in the evaporator to obtain the viscous polymer (52 g), the IR spectrum of which is shown in FIG. 1. The characteristic absorption peak attributed to the Si—Cl bonds appeared at 600 cm$^{-1}$ but quickly disappeared in the air.

When the polymer was thinly coated on a glass plate, it was almost completely cured after 30 minutes to form a film, which was insoluble in $Cl(CF_2CFCl)_2Cl$ and other solvents.

Figure 2:
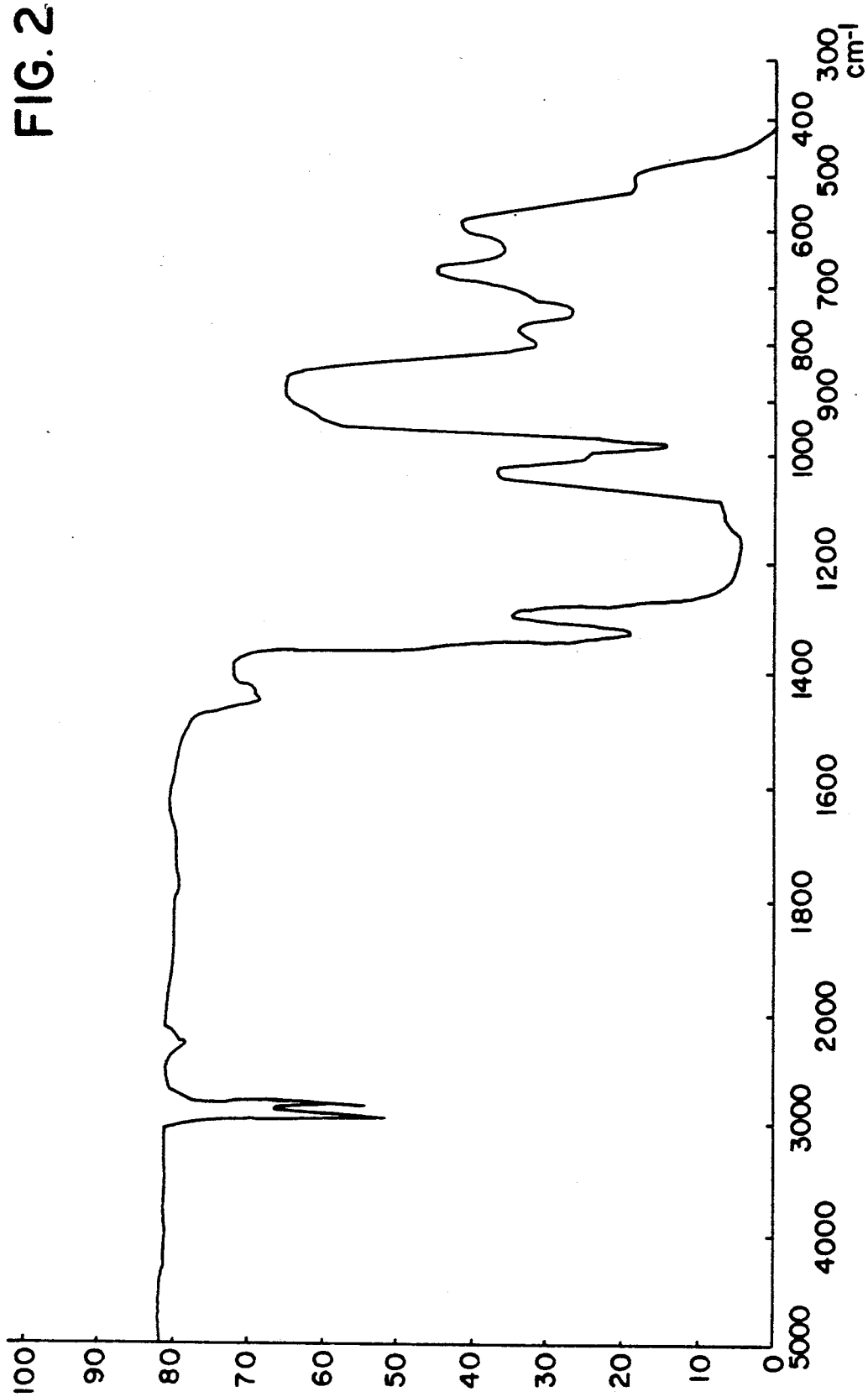

(3) In a solution of the viscous polymer obtained in the step (2) (30 g) in perfluorobenzene (40 g), zinc powder (2.3 g) was dispersed. Then, to the mixture, methanol (5 ml) was dropwise added in a nitrogen atmosphere while stirring. After the addition of about 1.5 ml of methanol, the exothermic reaction almost ceased. After all methanol was added over about one hour, the reaction was continued at room temperature for 2 hours. After the reaction was completed, additional 5 ml of methanol was added to cause phase separation. To the lower phase recovered, another 5 ml of methanol was added and the mixture was kept standing for 16 hours. Then, the separated lower phase was recovered. The recovered product was a transparent viscous liquid. When the product was coated on a glass plate, curing was started from the surface within several hours and completed in a day to form a transparent tough film which firmly adhered to the glass. The film was not dissolved in perfluorobenzene, which indicated that the cross-liking of the polymer was almost completely finished. Elementary analysis revealed that no iodine was contained in the film. The IR spectrum of the polymer is shown in FIG. 2. Characteristic absorption peaks attributed to the Si—OCH$_3$ bonds appeared at 2,950, 2,850, 1,460 and 805 cm$^{-1}$, which gradually disappeared as the curing proceeded.

The cured film was not deteriorated or discolored or peeled off when dipped in boiling water, concentrated sulfuric acid at 100° C. or 30 % fuming sulfuric acid at 40° C. for 72 hours. These tests showed that the cured polymer was highly chemically stable.

The critical surface tension of the cured film was 13.5 dyne/cm. A sheet of paper treated with a 50 % solution of the polymer in trichlorotrifluoroethane had good water-and oil-repellency and the hand touch feeling of the treated paper remained unchanged.

The polymer obtained in the step (3) was overcoated on an automobile coating to form a film having a thickness 10 μm or less. After six months, the film had the original water-repellency and stainproofness.

When leather products such as shoes were treated with a 5% solution of the polymer in trichlorotrifluoroethane, excellent water-repellency and stainproofness could be imparted to the leather products, and such effects remained unchanged after three months use.

The treatment of the goods with the polymer of the present invention requires no after-treatment. The polymer can be applied to the goods only by coating the polymer or polymer solution thereon.

The polymer of the present invention is useful in water-repellent and stainproofing treatment of play suits, clothing, rain wears and umbrellas.

EXAMPLE 2

(1) After an internal space of an autoclave having an internal volume of 3 liters was thoroughly replaced with hexafluoropropylene (hereinafter referred to as "HFP"), a mixture of deaerated trichlorotrifluoroethane (400 ml), 1.6-diiodoperfluorohexane (100 g) and IPP (5 g) was charged and then HFP (420 g) was injected As soon as a gaseous mixture of vinylidene fluoride (VDF)/HFP/TFE in a molar ratio of 50/30/20 was injected to 9 kg/cm$^2$G, the interior pressure dropped. Whenever the pressure dropped by 1 kg/cm$^2$G, the same gaseous mixture was injected to repressurize the autoclave interior and the reaction was continued. After 2 hours from the start of polymerization, the temperature and pressure were changed to 45° C. and 11–12 kg/cm$^2$G, respectively, and after 6 hours from the start of polymerization, to 50° C. and 10–11 kg/cm$^2$G, respectively. After 9 hours from the start of polymerization, the temperature was lowered to room temperature and the gas was purged to terminate the polymerization. The product was a slightly viscous liquid, which was treated in a rotary evaporator at an elevated temperature under reduced pressure to remove the volatiles off to obtain a liquid polymer (730 g) which was highly viscous but flowable at room temperature.

The GPC analysis revealed that the produced polymer had Mn of 3,200, Mw of 4,100 and Mw/Mn of 1.28.

The monomer ratio in the polymer was substantially the same as that of the continuously charged monomer mixture, and the iodine content was 6.1%.

Figure 3:
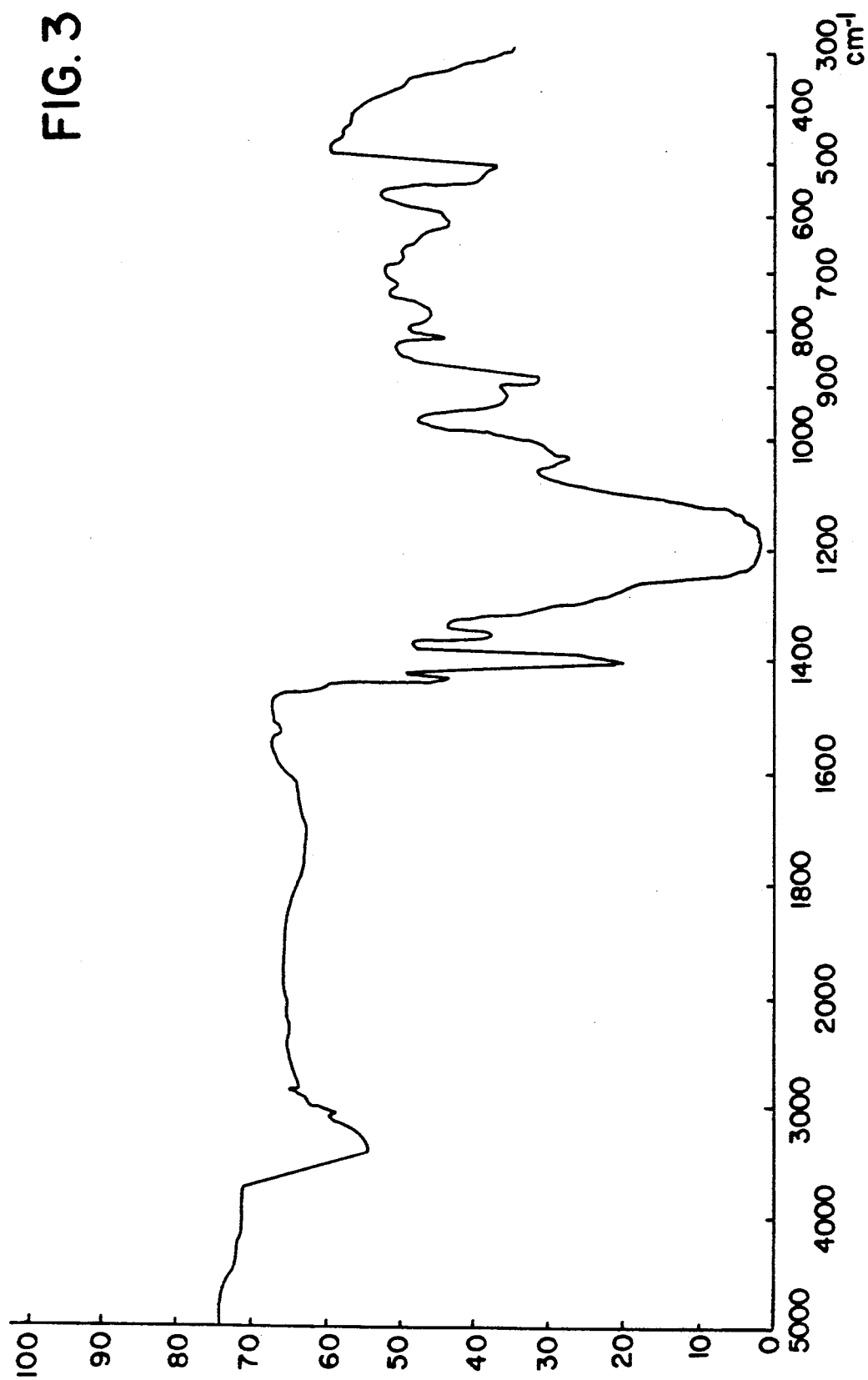
FIGS. 3 and 4 are the IR spectra of the polymers obtained in Example 2 (2) and (3)

The liquid polymer (60 g) was dissolved in $Cl(CF_2CFCl)_2Cl$ (80 ml) contained in a 300 ml flask equipped with a magnetic stirrer. To the resulting solution, vinyltrichlorosilane (28 g) and di-tert.-butylperoxide (0.5 g) were added and the system was thoroughly replaced with nitrogen gas. The mixture was heated to 100° C. in a nitrogen stream to start the reaction. Thereafter, the reaction was continued for 5 hours while gradually raising the temperature to 130° C. From the product, the unreacted silane and the solvent were distilled off with the rotary evaporator to obtain a viscous polymer (69 g), the IR spectrum of which is shown in FIG. 3. The characteristic absorption peak attributed to the Si—Cl bonds appeared around 600 cm$^{-1}$ and disappeared as the curing proceeded in the air. At 3,400 cm$^{-1}$, the absorption peak attributed to the intermediate silanol group was found.

When the polymer was thinly coated on a glass plate, it was cross linked within one minute to give a film which was insoluble in solvents.

(2) In a 100 ml flask equipped with a magnetic stirrer, a solution of the polymer obtained in the step (1) (26 g) in perfluorobenzene (14 g) was charged together with zinc powder (1.7 g) and then, to the mixture, methanol was dropwise added at room temperature while stirring in a nitrogen stream. The reaction proceeded with generating heat and hydrogen gas. When about 1.4 g of methanol was added, the generation of hydrogen gas substantially ceased, but 3 g of methanol was further dropwise added and the mixture was stirred for 3 hours. After the product was kept standing overnight, a pale pink liquid phase was separated from the emulsion containing the reaction product of zinc. From the liquid phase, zinc chloride and iodide were extracted with a mixture of methanol and ethylene glycol of a volume ratio of 1:1 to obtain a solution of the desired product in perfluorobenzene.

When this solution was coated on a glass plate, its curing started from the surface within several hours. After kept standing at room temperature for 3 days, the film of 0.2 mm in thickness was substantially cured. When the coated polymer was heated at 100° C. in the air, the curing was completed in a day.

Figure 4:
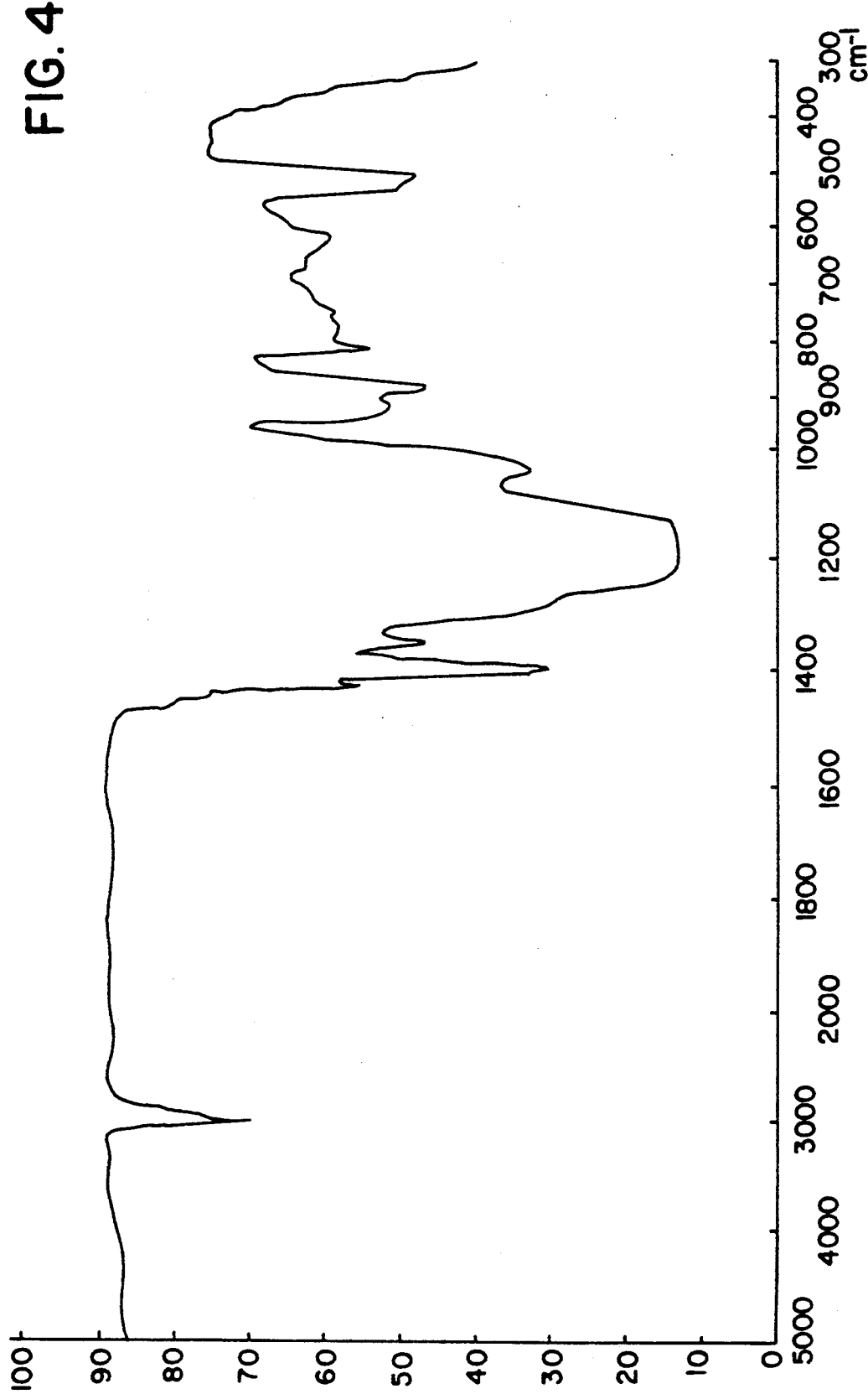

The cured film was in the hard rubber state and not dissolved in a solvent such as acetone. The IR spectrum of this polymer is shown in FIG. 4. The characteristic absorption peaks attributed to the Si-OCH$_3$ bonds appeared at 2,950, 2,850 and 810 cm$^{-1}$ but disappeared as the curing proceeded. According to the elementary analysis, no iodine was contained in the polymer.

Alternative to the above one-step method, the trichlorosilyl groups can be converted to the trialkoxy groups by reacting the polymer with methanol in an excess amount of trichlorotrifluoroethane, removing methanol, trichlorotrifluoroethane and generated hydrogen chloride, dissolving the intermediate product in dimethoxyethane, reacting the product with zinc powder in the solution and then treating the product with a mixture of methanol and ethylene glycol. The IR spectrum of the product produced by this method is substantially the same as FIG. 4.

When the above two-steps are carried in the reverse order, that is, when the polymer is firstly reacted with zinc powder in dimethoxyethane, the intermediate product is stable unless it is exposed to the air, but once it is exposed to the air, it is quickly cured. For example, a film of 0.2 mm or less in thickness is cured in several seconds. The product produced by treating the intermediate product with methanol is very unstable and cured without exposing to the air. This curing manner can be utilized in the preparation of varnish.

Example 3

Figure 5:
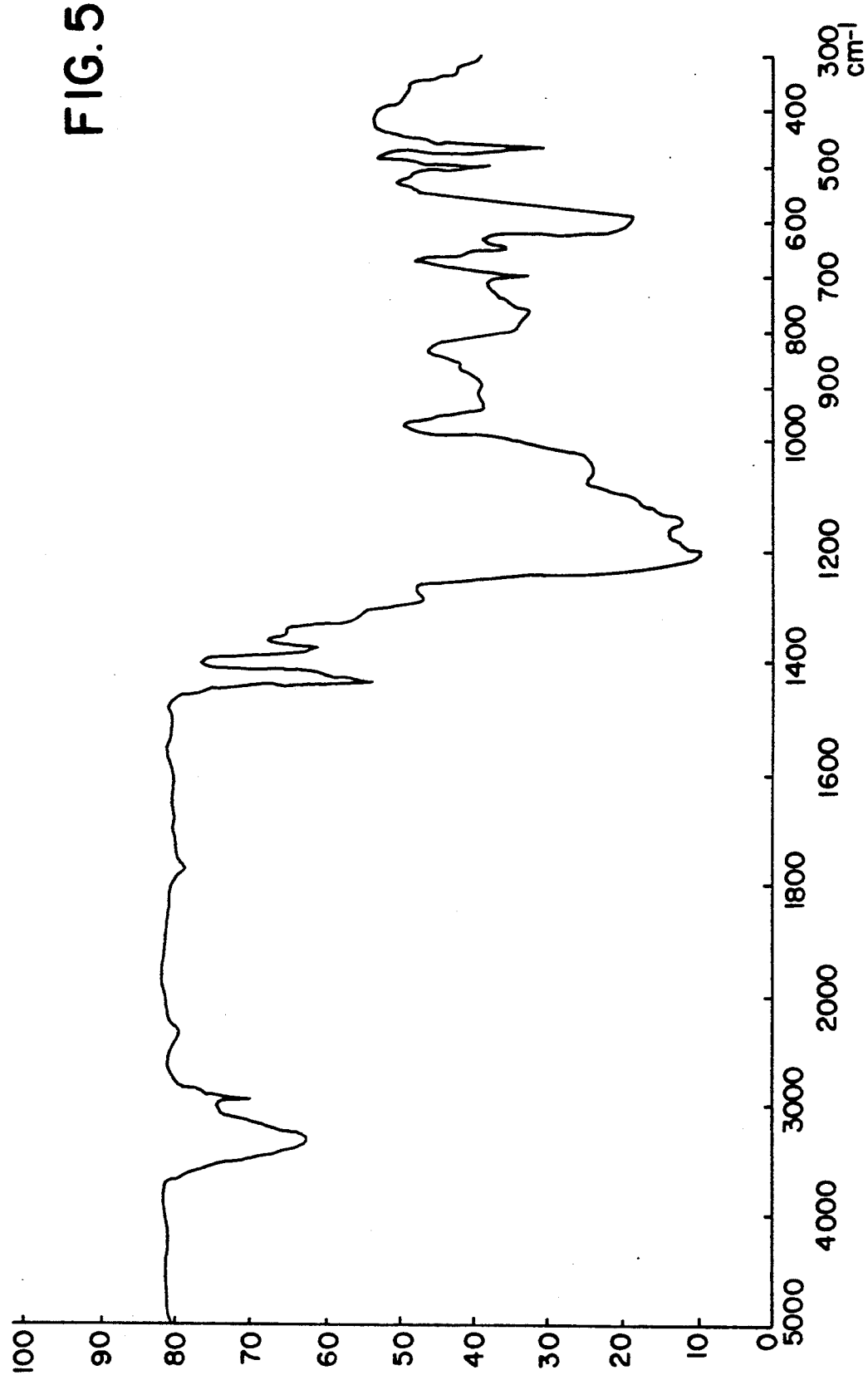
FIGS. 5 and 6 are the IR spectra of the polymers obtained in Example 3 (2) and (3)

(1) To a 300 ml flask equipped with a magnetic stirrer, I(CF$_2$CF$_2$)$_4$I (80 g) and Cl(CF$_2$CFCl)$_2$Cl (150 g) were charged and stirred to prepare a solution, to which vinyltrichlorosilane (60 g) and DTBP (1.25 g) were added. After replacing the interior space with nitrogen, the mixture was heated to 100° C. while stirring to start the reaction. Then, the mixture was gradually heated to 130° C. over 5 hours. The product was treated in a vacuum evaporator to obtain a viscous polymer (125 g) containing a small amount of Cl(CF$_2$CFCl)$_2$Cl. The IR spectrum of this polymer is shown in FIG. 5.

When the polymer was coated on a glass plate, it was cured within several minutes.

Figure 6:
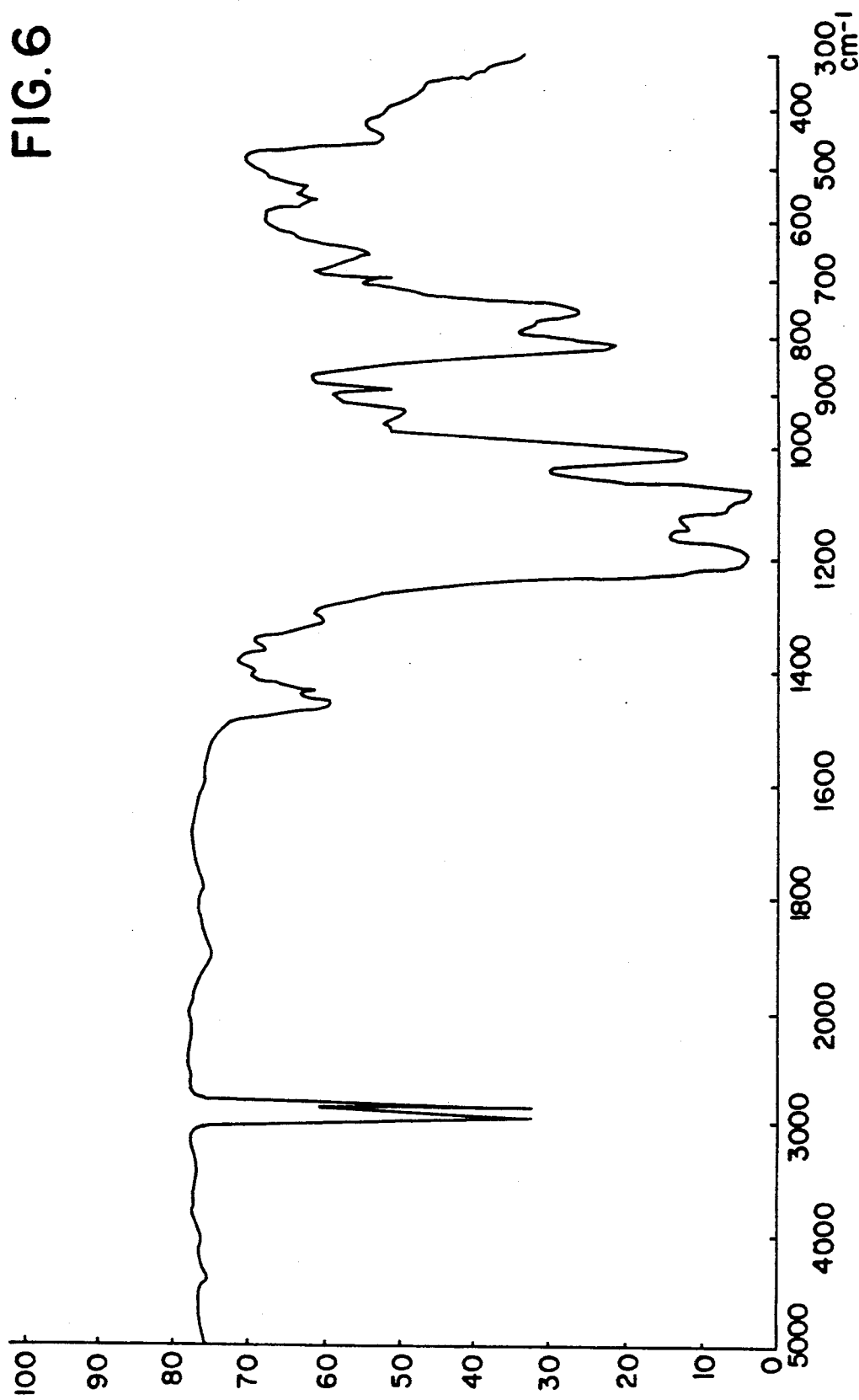

(2) In the same manners as in Example 1, the polymer obtained in the step (1) of this Example was treated with zinc powder and methanol to reduce the bound iodine atoms and to convert the trichlorosilyl groups to the trimethoxysilyl groups. When the obtained polymer was coated on a glass plate, it was cured in two days to form a hard film, the IR spectrum of which is shown in FIG. 6.

The cured polymer of Example 3 is harder but more fragile than those obtained in Examples 1 and 2.

By the treatments with zinc powder and isopropanol, the polymer having the same properties as above is produced. However, with tert.-butanol, the reaction is not completed and the polymer is cured during treatment. When ethylene glycol is used, the system tends to be gelled. When methanol is added to the gelled system and kept standing, the gel gradually disappears so that the system is changed to a solution. This is due to polymerization through formation of a silyl ester with ethylene glycol and transesterification with methanol.

Example 4

(1) In a 500 ml autoclave, I(CF$_2$CF$_2$)$_2$I (220 g) and DTBP (1.5 g) were charged. After replacing the interior atmosphere with chlorotrifluoroethylene (hereinafter referred to as "CTFE"), CTFE (35 g) was injected and heated to 110° C. while stirring to start the reaction. The pressure was dropped from the maximum pressure of 8.5 kg/cm$^2$G to 1 kg/cm$^2$G at 120° C. after 6 hours. Immediately, the oily pink product was treated in a vacuum evaporator to distill the unreacted I(CF$_2$CF$_2$)$_2$I and the volatiles to obtain a greasy polymer (70 g) having a pour point of 60° C.

Different from polychlorotrifluoroethylene, this polymer was soluble in tetrahydrofuran and had Mn of 1,830, Mw/Mn of 1.3 according to GPC analysis.

Figure 7:
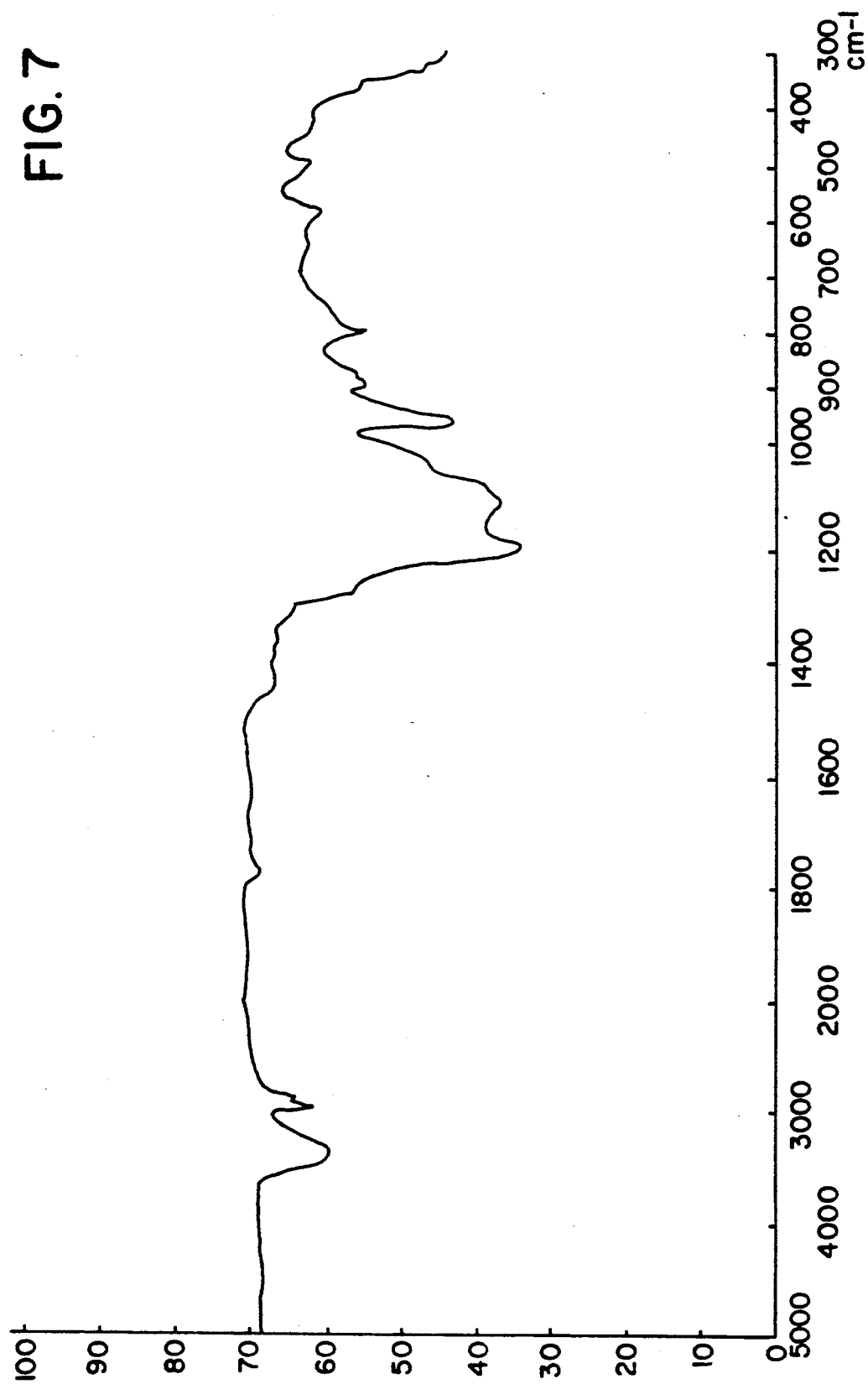
FIG. 7 is the IR spectrum of the polymer obtained in Example 4 (2)

(2) After adding the vinyltrichlorosilane to the polymer obtained in the step (1), the polymer was treated with zinc powder and methanol in the same manners as in Example 1 to obtain a methoxysilane type polymer, the IR spectrum of which is shown in FIG. 7.

The cured material of the polymer was very hard and tough.

Example 5

In the same manner as in Example 4 but using the same amount of CF$_2$ClCFClI in place of I(CF$_2$CF$_2$)$_2$I and 780 g of CTFE, the reaction was carried out to obtain a greasy polymer (92 g).

Although the methoxysilane type polymer produced from the above polymer in the same manner as in Example 1 could be cured, the curing rate was smaller than that in Example 4 and the cured material was slightly weak and less fragile than that in Example 4. This means that the mechanical properties of the cured material of the polyfunctional telechelic polymer are better.

Example 6

Figure 8:
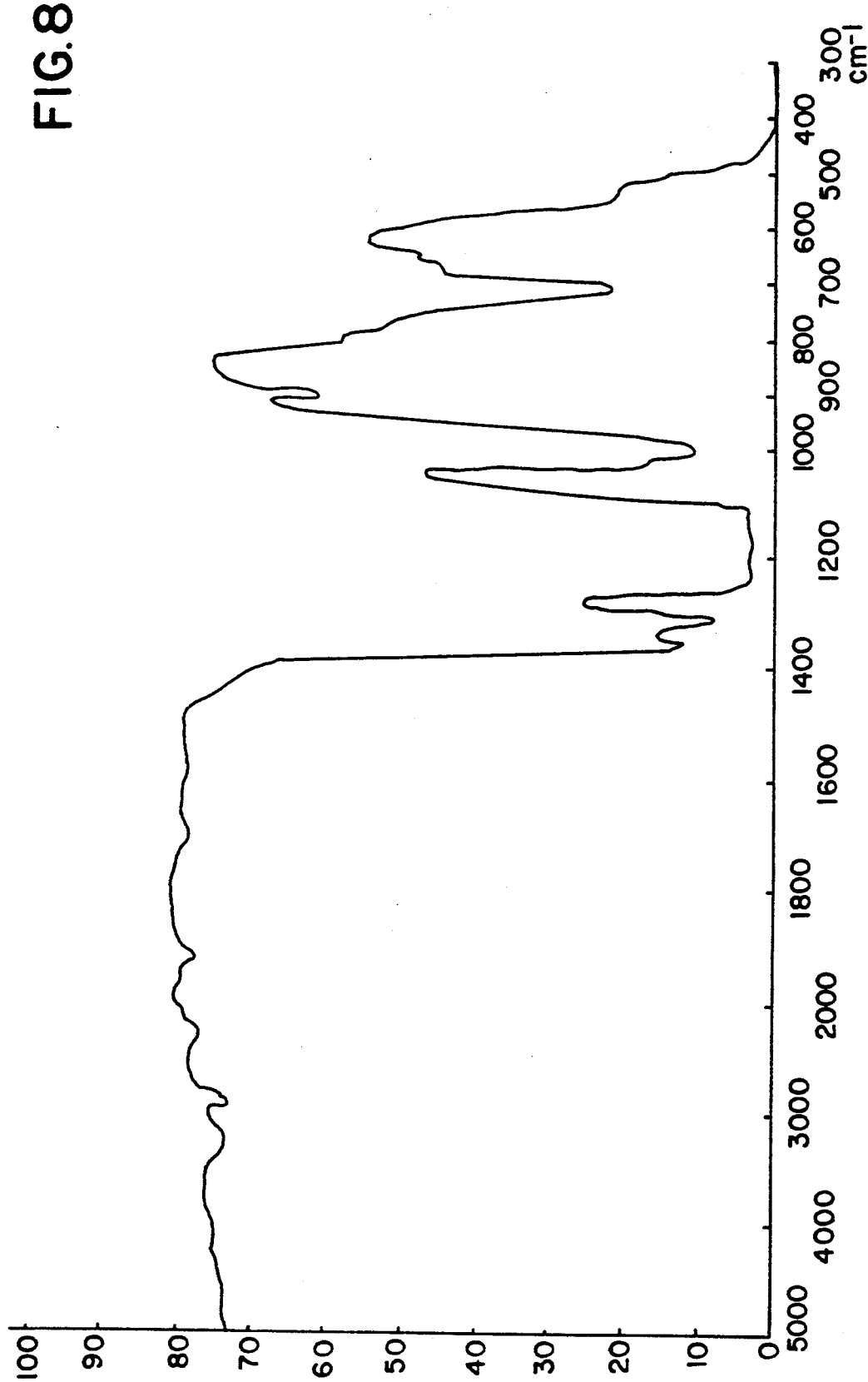
FIG. 8 is the IR spectrum of the polymer obtained in Example 6.

In the same manner as in Example 5 but using, as the iodinated prepolymer, C$_3$F$_7$—(OCF$_2$CF$_2$CF$_2$)$_n$—OCF$_2$CF$_2$I in which n is about 24 on the average, the reaction was carried out to obtain an oily trichlorosilane type polymer. When this polymer was coated on a glass plate and kept standing for one day, it was incompletely cured and easily wiped off with trichlorotrifluoroethane. However, the surface of the glass plate having no visible material was water- and oil-repellent after repeated washing with trichlorotrifluoroethane. This means that the polymer can impart semipermanent water- and oil-repellency to the substrate. According to ESCA, it was confirmed that the polymer was bound to the glass surface. Therefore, this polymer is useful as the surface finishing agent. The IR spectrum of this polymer is shown in FIG. 8.

Example 7

Figure 9:
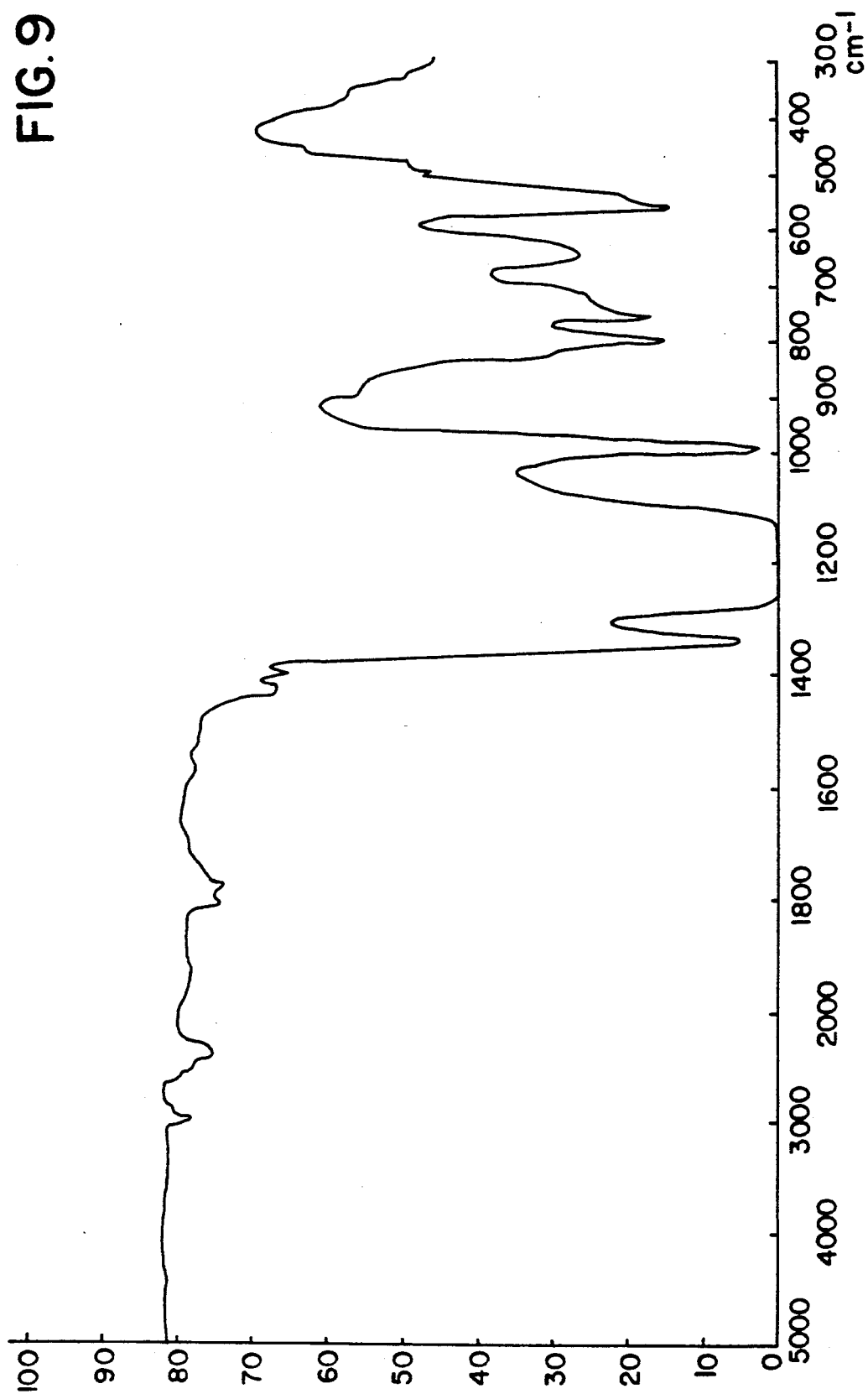

In the same manner as in Example 1 but using vinylmethyldichlorosilane in place of vinyltrichlorosilane, a polymer having the trimethoxysilane groups at both ends of the molecule was prepared. This polymer gave a cross linked material which is softer and more rubbery elastic than the polymer of Example 1. The IR spectra of the polymer of the trichlorosilyl type and the trimethoxysilyl type are shown in FIGS. 9 and 10, respectively.

When the polymers having the iodine atoms of Examples 2 to 4 are used, the prepared polymers give softer cured materials.

Example 8

In the same manner as in Example 2 but using vinyltriethoxysilane and AIBN in place of vinyltrichlorosilane and DTBP, respectively and adjusting the reaction temperature at 70–80° C., the prepolymer was prepared. A solution of the prepolymer in dimethoxyethane was reacted with zinc powder and then diluted with trichlorotrifluoroethane to precipitate a white material. The precipitated material was filtered off, and the filtrate was concentrated in an evaporator to give a polymer, which had good curing characteristics.

Example 9

A copolymer (6 g) which consisted of 68 % by mole of TFE and the rest of the perfluorovinyl ether of the formula:

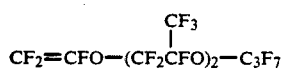

and had a molecular weight of $3.6 \times 10^4$ and iodine atoms at the molecular ends was finely dispersed in perfluorohexane (50 g) with a homogenizer. Then, to a 100 ml flask, the dispersion was charged together with vinyltrichlorosilane (5 g) and IPP (0.1 g) and heated to 40° C. in a nitrogen stream while stirring followed by reaction at the same temperature for 5 hours. The product was mixed with methanol (100 ml) in the homogenizer in a nitrogen stream and then treated with an evaporator at room temperature under reduced pressure to obtain a rubbery mass (5 g).

The rubbery mass was placed between a pair of aluminum foils and pressed at 100° C. to obtain a sheet of 0.5 mm in thickness, which was in the state of a soft raw rubber. After kept standing at room temperature for one week, the sheet was cured to exhibit properties of the cross linked material, although the elongation was about 50% so that the cured material seemed to be fragile.

Example 10

Perfluoropolyether having the carboxyl group at both ends of the molecule [HOOCCF$_2$CF$_2$—(OCF$_2$CF$_2$CF$_2$)$_n$—OCF$_2$CF$_2$—COOH in which n is about 35 on the average] was neutralized with potassium hydroxide and dried. Then, the dried polymer (100 g) was mixed with potassium carbonate fine powder (20 g) and iodine (20 g) in a mortar. Then, to a 500 ml flask equipped with stirring blades made of PTFE, the mixture was charged together with Cl(CF$_2$CFCl)$_2$Cl (20 ml) and Cl(CF$_2$CFCl)$_3$Cl (100 ml) and gradually heated on an oil bath from 100° C. Around 180° C, the reaction was started to generate carbon dioxide. Over 4 hours, the mixture was gradually heated up to 220° C. When the generation of carbon dioxide substantially ceased, the mixture was cooled to room temperature. Then, the reaction mixture was filtered through a glass filter while washing with trichlorotrifluoroethane. The filtrate was evaporated with a vacuum evaporator to obtain an oily product (92 g), 80 % or more of which was perfluoropolyether having iodine atoms at both ends of the molecule and about 10% of which was the polymer having the CF$_2$H group at the molecular end.

By using this iodinated polymer as the prepolymer, a trichlorosilane type telechelic polymer was prepared in the same manner as in Example 1. The telechelic polymer was cured slowly on a glass plate to give a rubbery cured material, which had such good low temperature properties that it was not frozen in dry ice.

What is claimed is:

1. A polymer of the formula:

$$PC—[CH_2CHY—(CH_2)_n—SiR_xX_{3-x}]_m$$

wherein PC is a fluoropolymer chain, X is a monovalent functional group, Y is a hydrogen atom or a lower alkyl group, R is a hydrogen atom or an inactive monovalent organic group, x is an integer of 0 to 3, m is a positive integer which is not larger than the number of ends of the polymer chain PC, and n is 0, 1 or 2, having a molecular weight of $5 \times 10^2$ to $5 \times 10^6$.

2. A curable polymer composition comprising a polymer claimed in claim 1.

3. A sealing agent comprising a polymer claimed in claim 1.

4. A coating comprising a polymer claimed in claim 1.

5. A coupling agent comprising a polymer claimed in claim 1.

6. A finishing agent comprising a polymer claimed in claim 1.

* * * * *